United States Patent
Galpin et al.

(10) Patent No.: US 12,395,656 B2
(45) Date of Patent: Aug. 19, 2025

(54) VIRTUAL PIPELINE FOR VIDEO ENCODING AND DECODING

(71) Applicant: INTERDIGITAL MADISON PATENT HOLDINGS, SAS, Paris (FR)

(72) Inventors: Franck Galpin, Thorigne-Fouillard (FR); Fabien Racape, San Francisco, CA (US); Philippe Bordes, Laille (FR)

(73) Assignee: InterDigital Madison Patent Holdings, SAS, Paris (FR)

(*) Notice: Subject to any disclaimer, the term of this patent is extended or adjusted under 35 U.S.C. 154(b) by 0 days.

(21) Appl. No.: 18/640,304

(22) Filed: Apr. 19, 2024

(65) Prior Publication Data

US 2024/0283958 A1     Aug. 22, 2024

Related U.S. Application Data

(63) Continuation of application No. 17/290,943, filed as application No. PCT/US2019/060704 on Nov. 11, 2019, now abandoned.

(30) Foreign Application Priority Data

Nov. 12, 2018 (EP) .................................... 18306478

(51) Int. Cl.
*H04N 19/436* (2014.01)
*H04N 19/119* (2014.01)
(Continued)

(52) U.S. Cl.
CPC ......... *H04N 19/436* (2014.11); *H04N 19/119* (2014.11); *H04N 19/176* (2014.11);
(Continued)

(58) Field of Classification Search
None
See application file for complete search history.

(56) References Cited

U.S. PATENT DOCUMENTS

2013/0136175 A1    5/2013   Wang et al.
2014/0362919 A1   12/2014   Zhou et al.
(Continued)

FOREIGN PATENT DOCUMENTS

| CN | 105379278 A | 3/2016 |
|----|----|----|
| CN | 108449603 A | 8/2018 |
| WO | 2018/159987 A1 | 9/2018 |

OTHER PUBLICATIONS

Bross, et al., "Versatile Video Coding (Draft 2)", JVET-K1001-V1, Editors, Joint Video Experts Team (JVET) of ITU-T SG 16 WP3 and ISO/IEC JTC1/SC29/WG11, 11th Meeting: Ljubljana, SI, Jul. 10-18, 2018, 42 pages.
(Continued)

*Primary Examiner* — Rebecca A Volentine
(74) *Attorney, Agent, or Firm* — Condo Roccia Koptiw LLP

(57) ABSTRACT

Encoding or decoding video information can involve, for example, partitioning a coding unit of the video information using a partitioning based on a modification of a constraint on partitioning that is associated with a pipeline configuration for reconstruction of the coding unit, where the modification is based on an information dependency between two
(Continued)

or more pipeline units associated with the pipeline configuration, and encoding or decoding the video information based on the partitioning.

16 Claims, 13 Drawing Sheets

(51) Int. Cl.
*H04N 19/124* (2014.01)
*H04N 19/176* (2014.01)
*H04N 19/52* (2014.01)
*H04N 19/70* (2014.01)

(52) U.S. Cl.
CPC ............ *H04N 19/124* (2014.11); *H04N 19/52* (2014.11); *H04N 19/70* (2014.11)

(56) References Cited

U.S. PATENT DOCUMENTS

| | | |
|---|---|---|
| 2015/0023431 A1 | 1/2015 | Seregin |
| 2017/0324973 A1 | 11/2017 | Tanner et al. |
| 2017/0347096 A1 | 11/2017 | Hong et al. |
| 2018/0084284 A1 | 3/2018 | Rosewarne et al. |
| 2018/0213264 A1 | 7/2018 | Zhang et al. |
| 2019/0045210 A1 | 2/2019 | Guermazi et al. |
| 2020/0045336 A1* | 2/2020 | Xiu ...................... H04N 19/597 |
| 2020/0068198 A1 | 2/2020 | Yang et al. |
| 2020/0351494 A1* | 11/2020 | Yu ........................ H04N 19/513 |
| 2021/0314560 A1 | 10/2021 | Lai et al. |
| 2021/0329233 A1 | 10/2021 | Tsai et al. |
| 2022/0116600 A1* | 4/2022 | Rosewarne .......... H04N 19/157 |

OTHER PUBLICATIONS

Chen, Jianle et al., "Algorithm Description for Versatile Video Coding and Test Model 2 (VTM 2)", Joint Video Experts Team (JVET) of ITU-T SG 16 WP 3 and ISO/IEC JTC 1/SC 29/WG11; Editors; 11th Meeting: Ljubljana, SI; JVET-K1002-V2, Jul. 10-18, 2018, 21 pages.

ITU-T, "High Efficiency Video Coding", Recommendation ITU-T H.265, Series H: Audiovisual and Multimedia Systems, Infrastructure of Audiovisual Services—Coding of Moving Video, Oct. 2014, 540 pages.

Ma (Fraunhofer), et al., "Summary report for CE1: Partitioning", JVET of ITU-T SG 16 WP 3 and ISO/IEC JTC, 1/SC 29WG 11; 12th Meeting: Macao, Oct. 3-12, 2018, 16 pages.

Sze, et al., "High Efficiency Video Coding (HEVC)", Integrated Circuits and Systems, Algorithms and Architectures, Spring International Publishing, Aug. 23, 2014, 384 pages.

Tsai, et al., "CE1.2.1: Constraint for binary and ternary partitions", JVET of ITU-T SG 16 WP 3 and ISO/IEC JTC 1/ SC 29WG 11; 12th Meeting: Macao, CN, Oct. 3-12, 2018, Document: JVET-L0081-v2, 6 pages.

Xu, et al., "CE 1: Rectangular virtual pipeline data unit (Test 1.1.1) and supplementary results", JVET of ITU-T SG 3 16 WP 3 and ISO/IEC JTC 1/SC 29WG 11; 13th Meeting: Marrakech, MA, Jan. 9-18, 2019, Document: JVET-M0446-v1, Jan. 9-18, 2019, 6 pages.

\* cited by examiner

VIRTUAL PIPELINE FOR VIDEO ENCODING AND DECODING

CROSS REFERENCE TO RELATED APPLICATIONS

This application is a continuation of U.S. patent application Ser. No. 17/290,943, which is the National Stage Entry under 35 U.S.C. § 371 of Patent Cooperation Treaty Application No. PCT/US2019/060704, filed Nov. 11, 2019, which claims priority from European Patent Application No. 18306478.1, filed Nov. 12, 2018, the disclosures of each of which are incorporated by reference herein in their entireties.

TECHNICAL FIELD

The present disclosure generally relates to video encoding and decoding.

BACKGROUND

To achieve high compression efficiency, image and video coding schemes usually employ predictive and transform coding to leverage spatial and temporal redundancy in the video content. Generally, intra or inter prediction is used to exploit the intra or inter frame correlation, then the differences between the original blocks and the predicted blocks, often denoted as prediction errors or prediction residuals, are transformed, quantized, and entropy coded. To reconstruct the video, the compressed data is decoded by inverse processes corresponding to the prediction, transform, quantization, and entropy coding.

Recent additions to video compression technology include various versions of the reference software and/or documentations Joint Exploration Model (JEM) and Versatile Video Coding (VVC) Test Model (VTM) being developed by the Joint Video Exploration Team (JVET) as part of development of a new video coding standard known as Versatile Video Coding (VVC). The aim of JEM, VTM and, more generally, VVC, is to make further improvements to the existing HEVC (High Efficiency Video Coding) standard.

SUMMARY

In general, at least one example of an embodiment can involve apparatus for encoding video information comprising one or more processors configured to partition a coding unit of the video information using a partitioning based on a modification of a constraint on partitioning, wherein the constraint is associated with a pipeline configuration for reconstruction of the coding unit, and the modification is based on an information dependency between two or more pipeline units associated with the pipeline configuration; and encode the video information based on the partitioning.

In general, at least one other example of an embodiment can involve apparatus for decoding video information comprising one or more processors configured to obtain an indication of a partitioning of a coding unit of the video information, wherein the partitioning is based on a modification of a constraint on partitioning, the constraint is associated with a pipeline configuration for decoding, and the modification is based on an information dependency between two or more pipeline units associated with the pipeline configuration; and decoding the video information based on the partitioning and using the pipeline configuration.

In general, at least one other example of an embodiment can involve a method for encoding video information comprising partitioning a coding unit of the video information using a partitioning based on a modification of a constraint on partitioning, wherein the constraint is associated with a pipeline configuration for reconstruction of the coding unit, and the modification is based on an information dependency between two or more pipeline units associated with the pipeline configuration; and encoding the video information based on the partitioning.

In general, at least one other example of an embodiment can involve a method for decoding video information comprising obtaining an indication of a partitioning of a coding unit of the video information, wherein the partitioning is based on a modification of a constraint on partitioning, the constraint is associated with a pipeline configuration for decoding, and the modification is based on an information dependency between two or more pipeline units associated with the pipeline configuration; and decoding the video information based on the partitioning and using the pipeline configuration.

In general, at least one example of an embodiment can involve providing one or more syntax elements indicating a partitioning of a coding unit based on a modification of a constraint on partitioning, wherein the constraint is associated with a pipeline configuration for reconstruction of the coding unit, and the modification is based on an information dependency between two or more pipeline units associated with the pipeline configuration.

In general, at least one example of an embodiment can involve a bitstream formed by including information indicating a partitioning of a coding unit based on a modification of a constraint on partitioning, wherein the constraint is associated with a pipeline configuration for reconstruction of the coding unit, and the modification is based on an information dependency between two or more pipeline units associated with the pipeline configuration.

In general, at least one example of an embodiment can involve a computer readable storage medium having stored thereon instructions for encoding or decoding video data in accordance with one or more embodiments described herein.

In general, at least one example of an embodiment can involve a non-transitory computer readable medium storing executable program instructions to cause a computer executing the instructions to perform a method according to one or more embodiments described herein.

The present embodiments also provide a computer readable storage medium having stored thereon a bitstream generated in accordance with one or more aspects and/or embodiments described herein.

The present embodiments also provide a method and apparatus for transmitting the bitstream generated in accordance with one or more aspects and/or embodiments described herein.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWINGS

The present disclosure may be better understood by consideration of the detailed description below in conjunction with the accompanying figures, in which.

It should be understood that the drawings are for purposes of illustrating examples of various aspects and embodiments and are not necessarily the only possible configurations. Throughout the various figures, like reference designators refer to the same or similar features.

DETAILED DESCRIPTION

Figure 1:
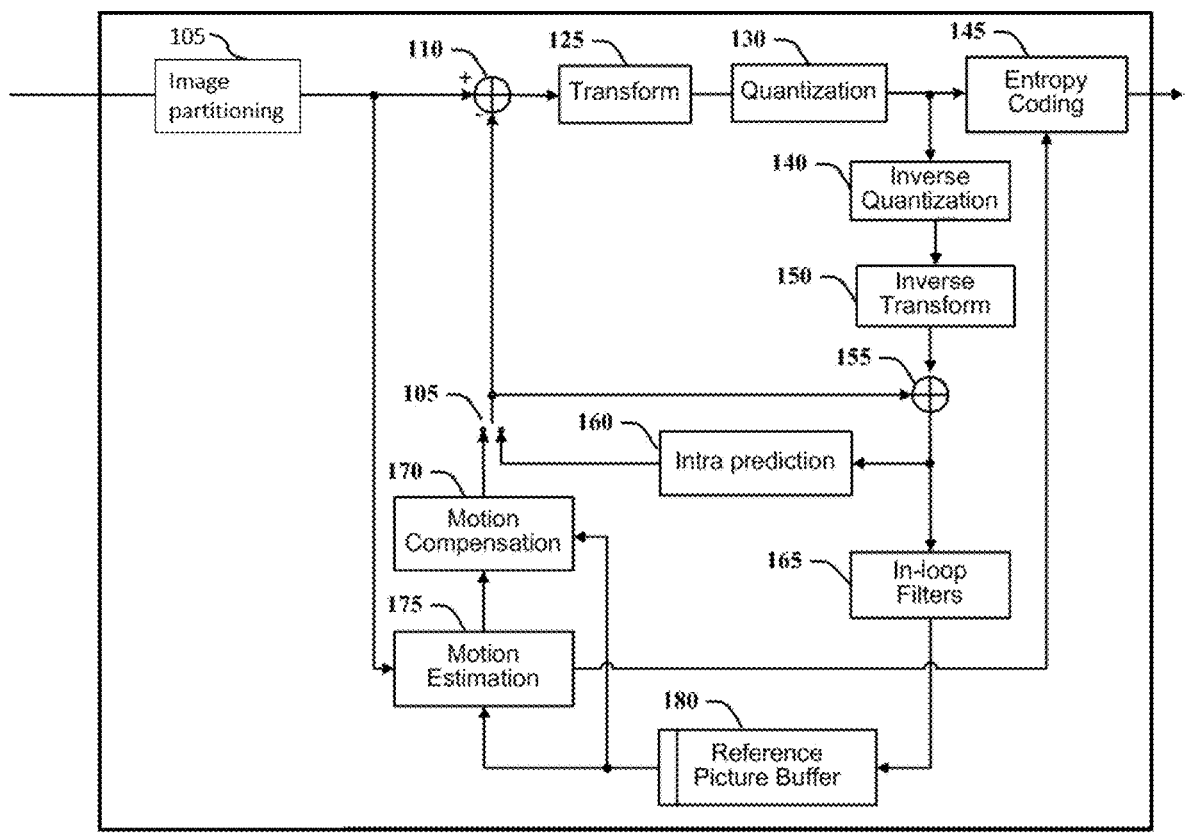
FIG. 1 illustrates a block diagram of an example of an embodiment of a video encoder.

Turning now to the figures, FIG. 1 illustrates an example of a video encoder 100, such as a High Efficiency Video Coding (HEVC) encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team) as part of development of a new video coding standard known as Versatile Video Coding (VVC).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU.

In JEM, the QTBT (Quadtree plus Binary Tree) structure removes the concept of multiple partition types in HEVC, i.e., removes the separation of CU, PU and TU concepts. A Coding Tree Unit (CTU) is first partitioned by a quadtree structure. The quadtree leaf nodes are further partitioned by a binary tree structure. The binary tree leaf node is named as Coding Units (CUs), which is used for prediction and transform without further partitioning. Thus, the CU, PU and TU have the same block size in the new coding QTBT block structure. In JEM, a CU consists of Coding Blocks (CBs) of different color components.

In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes as shown in FIG. 3A. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options in HEVC. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

Current proposals in JEM increase the number of the intra prediction modes compared with HEVC. For example, as shown in FIG. 3B, JEM 3.0 uses 65 directional intra prediction modes in addition to the planar mode 0 and the DC mode 1. The directional intra prediction modes are numbered from 2 to 66 in the increasing order, in the same fashion as done in HEVC from 2 to 34 as shown in FIG. 3A. The 65 directional prediction modes include the 33 directional prediction modes specified in HEVC plus 32 additional directional prediction modes that correspond to angles in-between two original angles. In other words, the prediction direction in JEM has twice the angle resolution of HEVC. The higher number of prediction modes has been proposed to exploit the possibility of finer angular structures with proposed larger block sizes.

For an inter CU in HEVC, the corresponding coding block is further partitioned into one or more prediction blocks. Inter prediction is performed on the PB level, and the corresponding PU contains the information about how inter prediction is performed. The motion information (e.g., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130). The transforms are generally based on separable transforms. For instance, a DCT transform is first applied in the horizontal direction, then in the vertical direction. For HEVC, transform block sizes of 4×4, 8×8, 16×16, and 32×32 are supported. The elements of the core transform matrices were derived by approximating scaled discrete cosine transform (DCT) basis functions. The HEVC transforms are designed under considerations such as limiting the dynamic range for transform computation and maximizing the precision and closeness to orthogonality when the matrix entries are specified as integer values. For simplicity, only one integer matrix for the length of 32 points is specified, and subsampled versions are used for other sizes. For the transform block size of 4×4, an alternative integer transform derived from a discrete sine transform (DST) is applied to the luma residual blocks for intra prediction modes.

In JEM, the transforms used in both directions may differ (e.g., DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
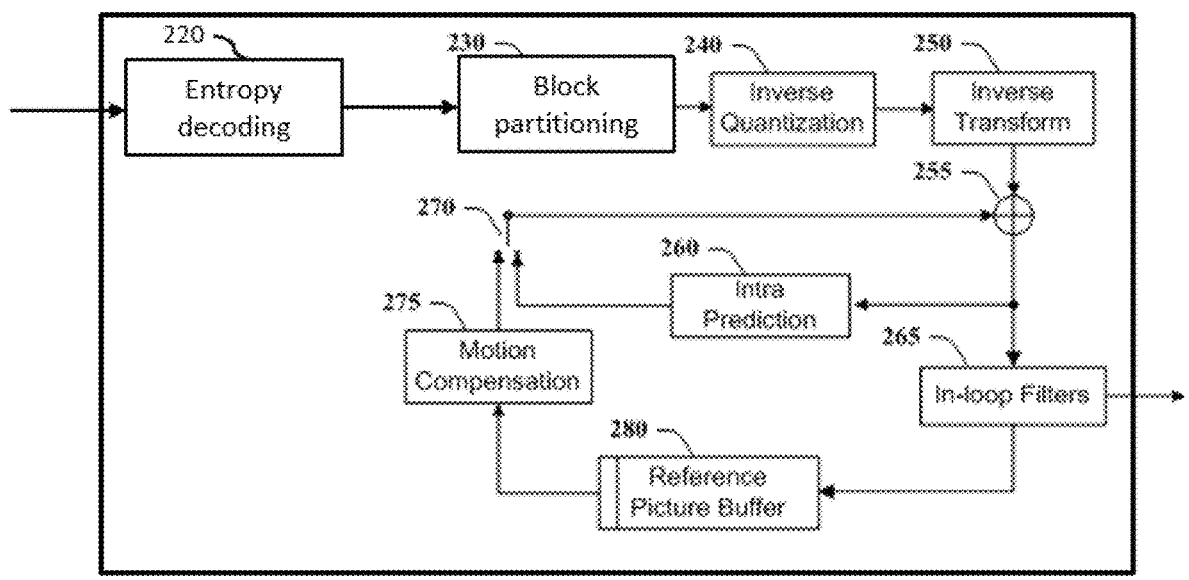
FIG. 2 illustrates a block diagram of an example of an embodiment of a video decoder.

FIG. 2 illustrates a block diagram of an exemplary video decoder 200, such as an HEVC decoder. In the exemplary decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder.

In particular, the input of the decoder includes a video bitstream, which may be generated by video encoder 100. The bitstream is first entropy decoded (230) to obtain transform coefficients, motion vectors, picture partitioning information, and other coded information. For HEVC, the picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. For JEM, the decoder may divide the picture based on the partitioning information indicating the QTBT structure. The transform coefficients are de-quantized (240) and inverse transformed (250) to decode the prediction residuals.

Combining (255) the decoded prediction residuals and the predicted block, an image block is reconstructed. The predicted block may be obtained (270) from intra prediction (260) or motion-compensated prediction (i.e., inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

As described above, the present disclosure involves the field of video compression. In general, an aspect involves improving compression efficiency compared to existing video compression systems and another aspect involves providing various aspects and embodiments for representing Luma and Chroma coding trees and coding the Luma and Chroma compressed blocks, in a way that jointly ensures high coding efficiency, while taking into account some hardware decoding pipeline constraints.

Figure 3:
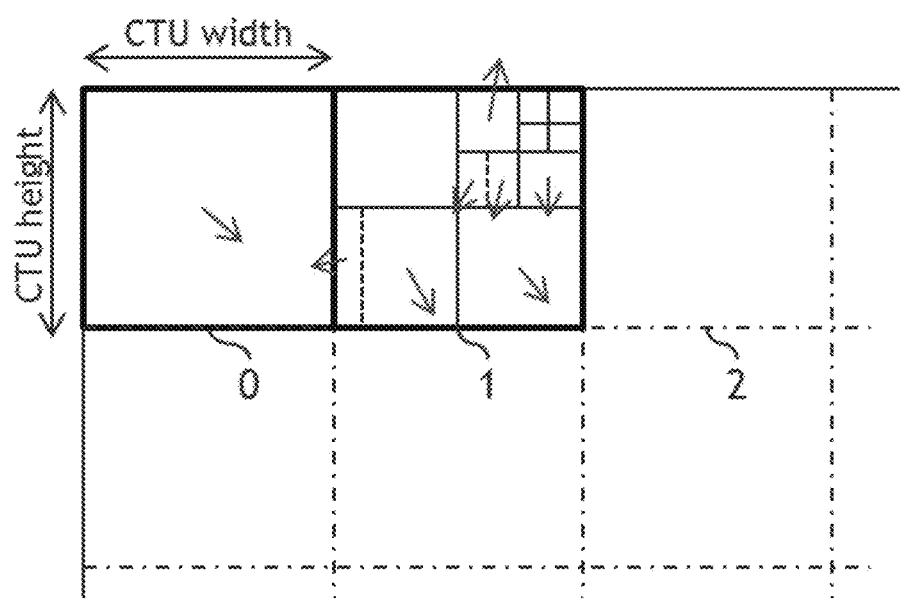
FIG. 3 illustrates Coding Tree Unit (CTU) and Coding Tree (CT) concepts to represent a compressed HEVC picture.
Figure 4:
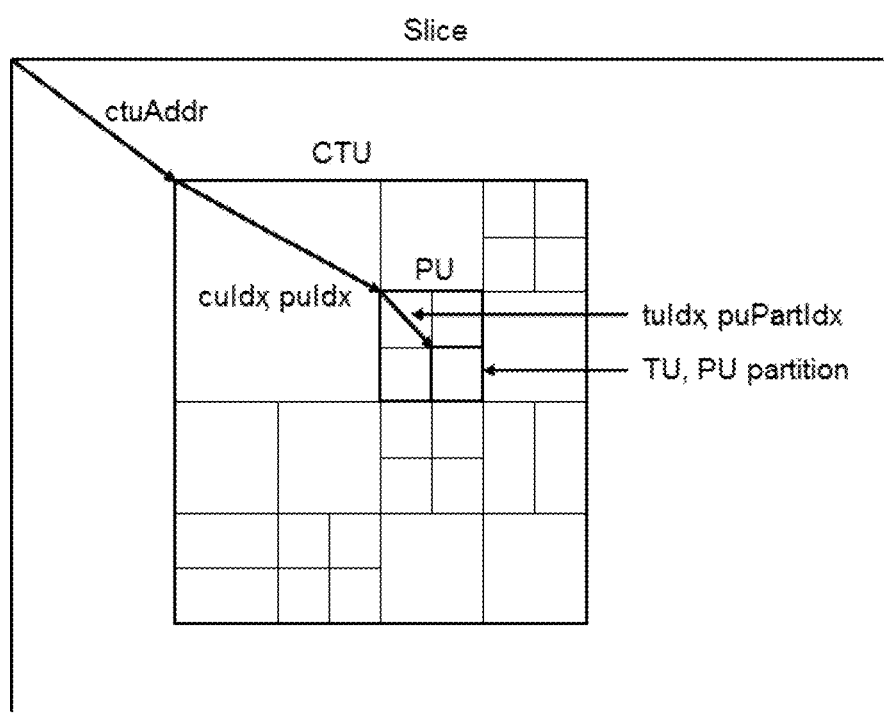
FIG. 4 illustrates division of a Coding Tree Unit (CTU) into Coding Units (CU), Prediction Units (PU) and Transform Units (TU)

In the HEVC video compression standard, a picture is divided into so-called Coding Tree Units (CTU), which size is typically 64×64, 128×128, or 256×256 pixels. Each CTU is represented by a Coding Tree in the compressed domain. This is a quad-tree division of the CTU, where each leaf is called a Coding Unit (CU), as illustrated in FIG. 3. Each CU is then given some Intra or Inter prediction parameters (Prediction Info). To do so, each CU is spatially partitioned into one or more Prediction Units (PUs), each PU being assigned some prediction information. The Intra or Inter coding mode is assigned on the CU level as illustrated in FIG. 4.

New emerging video compression tools include a Coding Tree Unit representation in the compressed domain in order to represent picture data in a more flexible way in the compressed domain. An advantage of this more flexible representation of the coding tree is that it provides increased compression efficiency compared to the CU/PU/TU arrangement of the HEVC standard.

Figure 5:
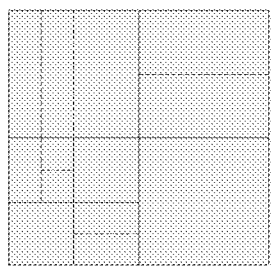
FIG. 5 illustrates an example of Quad-Tree Plus Binary-Tree (QTBT) CTU representation.
Figure 5:
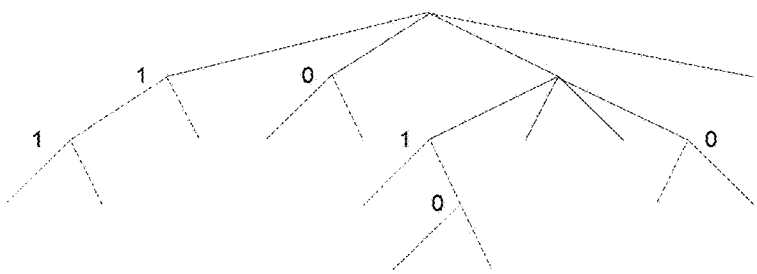

For example, the Quad-Tree plus Binary-Tree (QTBT) coding tool provides this increased flexibility. It involves a coding tree where coding units can be split both in a quad-tree and in a binary-tree fashion. An illustration of a QTBT type of coding tree representation of a Coding Tree Unit is illustrated in FIG. 5.

The splitting of a coding unit is decided on the encoder side, e.g., through a rate distortion optimization procedure which involves determining the QTBT representation of the CTU with minimal rate distortion cost.

In the QTBT technology, a CU has either a square or a rectangular shape. The size of a coding unit is typically a power of 2 in a range from 4 to 128.

In addition to this variety of rectangular shapes for a coding unit, this new CTU representation has characteristics such as the following that differ with respect to HEVC. The QTBT decomposition of a CTU is made of two stages: first the CTU is split in a quad-tree fashion, then each quad-tree leaf can be further divide in a binary fashion. This is illustrated on the right side of FIG. 5 where solid lines represent the quad-tree decomposition phase and dashed lines represent the binary decomposition that is spatially embedded in the quad-tree leaves.

In intra slices, the Luma and Chroma block partitioning structure is separated, and decided independently.

CU partitioning into predictions units or transform unit is no longer employed. In other words, each Coding Unit is systematically made of a single prediction unit (2N×2N prediction unit partition type) and single transform unit (no division into a transform tree).

Figure 6:
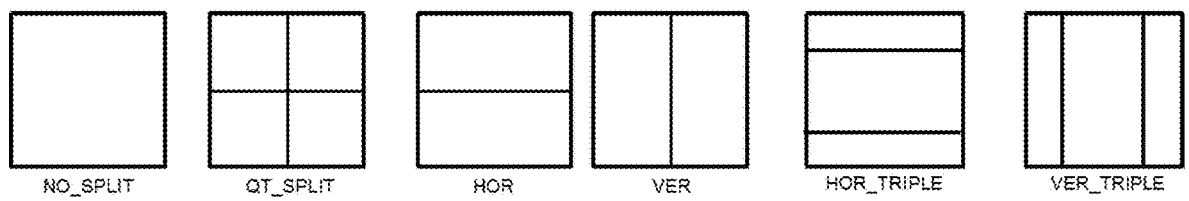
FIG. 6 illustrates an example of a set of CU partitions that may be used in an extended QTBT representation of a CTU.

Moreover, some other CU ternary tree partitioning may also be employed in the representation of the CTU's coding tree, e.g., in the VVC standard under development, as illustrated in FIG. 6. The CU partitions illustrated in FIG. 6 may be considered to provide an extended QTBT representation of a CTU. That is, a so-called triple-tree partitioning of a CU may be used, leading to the set of possible partitions illustrated in FIG. 6. Triple-tree partitioning involves splitting a CU into three sub-CU with size (¼, ½, ¼) relative to the parent CU, in the considered orientation.

Figures 7, 8:
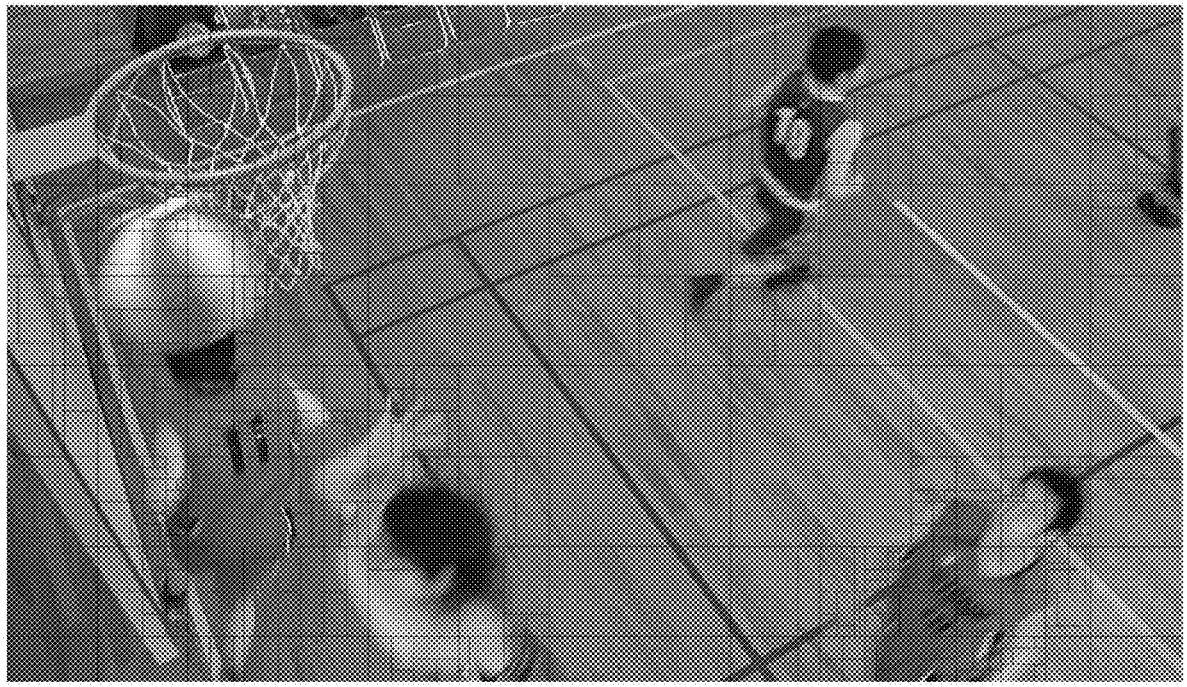
FIG. 7 illustrates an example of coding structures chosen to encode an example of a picture, e.g., Symmetrical Binary Tree, Asymmetric Binary Tree and Triple Tree decompositions that are embedded into the quad-tree.
FIG. 8 illustrates coding efficiency increase due to the use of a QTBT+ABT (Asymmetric Binary Tree) coding structure in the HEVC codec.

FIG. 7 shows an example of coding structures to encode a picture based on a typical block division of the picture by a video encoder that employs the split modes illustrated in FIG. 6. In FIG. 7, various squares indicated by the grid superimposed on the picture represent the Quad-Tree decomposition of CTUs and Symmetrical Binary-Tree, Asymmetric Binary Tree and Triple Tree decompositions that are embedded into the quad-tree. Topologies such as those described above including a coding structure such as QTBT+ABT (Asymmetric Binary Tree) can provide a significant coding efficiency improvement as illustrated in FIG. 8 for the HEVC codec.

Figure 9:
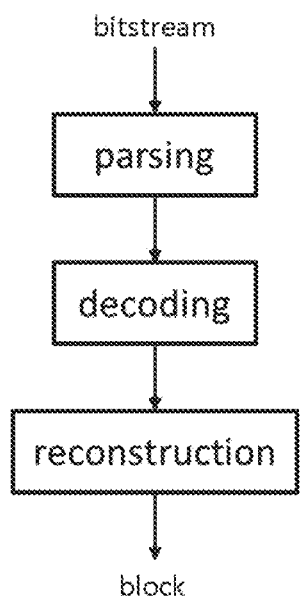
FIG. 9 illustrates an example of a processing pipeline for a decoder decoding an encoded video bitstream.
Figure 10:
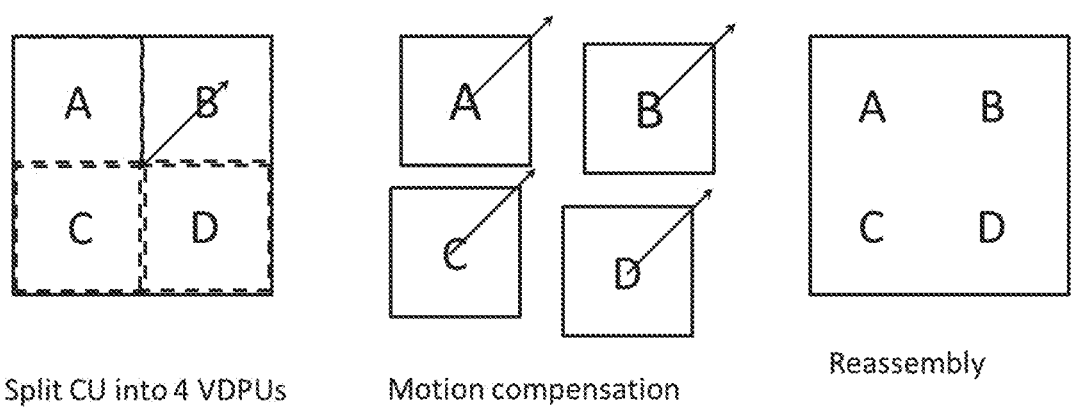
FIG. 10 illustrates an example of parallel processing of an inter prediction process involving a virtual pipeline decoding unit (VPDU) in accordance with at least one aspect of the present disclosure.

However, due to hardware constraints, not all topologies are allowed. An example of a traditional decoder pipeline is shown in FIG. 9. In FIG. 9:

The bitstream is parsed: split flags, modes, reference/ AMVP indexes etc.

Decoding: from the parsed values, the value of modes (e.g. from index to mode value) are recovered; all data needed for reconstruction are available.

Reconstruction: processing is performed to build the prediction samples and add the residuals to obtain the reconstructed samples values and up-date the motion fields etc.

For a codec such as WVC, a change compared to HEVC is that the construction of the prediction of a block (PU) cannot be necessarily split into several prediction processes and reassembled later. For example, FIG. 8 shows an example of parallel processing of an inter prediction process, assuming a VPDU (virtual pipeline decoding unit, i.e., the maximum size that a decoder can handle unitarily) of 64×64 and a CU of 128×128. FIG. 8 illustrates:

the motion information of the CU is decoded (for example the motion vector, the prediction mode, etc.);

the CU is split into four VPDUs and the motion information is copied into each VPDU;

each VPDU is processed independently (sequentially or in parallel); typically, a motion compensation is performed;

the results are then reassembled to form the final CU. Note that in this case, the CU cannot have a unique residual since the maximum transform size is set to 64×64 (the size of a VPDU). If the TU (i.e., the size of the resulting residual block) is more than 64 in one direction, a TU tiling can be done to cover the CU with TU size smaller than or equal to 64.

Examples of constraints brought by the VPDU can include the following:
 [C1] For each VPDU containing one or multiple CUs, the CUs are completely contained in the VPDU.
 [C2] For each CU containing one or more VPDUs, the VPDUs are completely contained in the CU.
 [C3] The processing order of CUs shall not leave a VPDU and re-visit it later.

Figure 11:
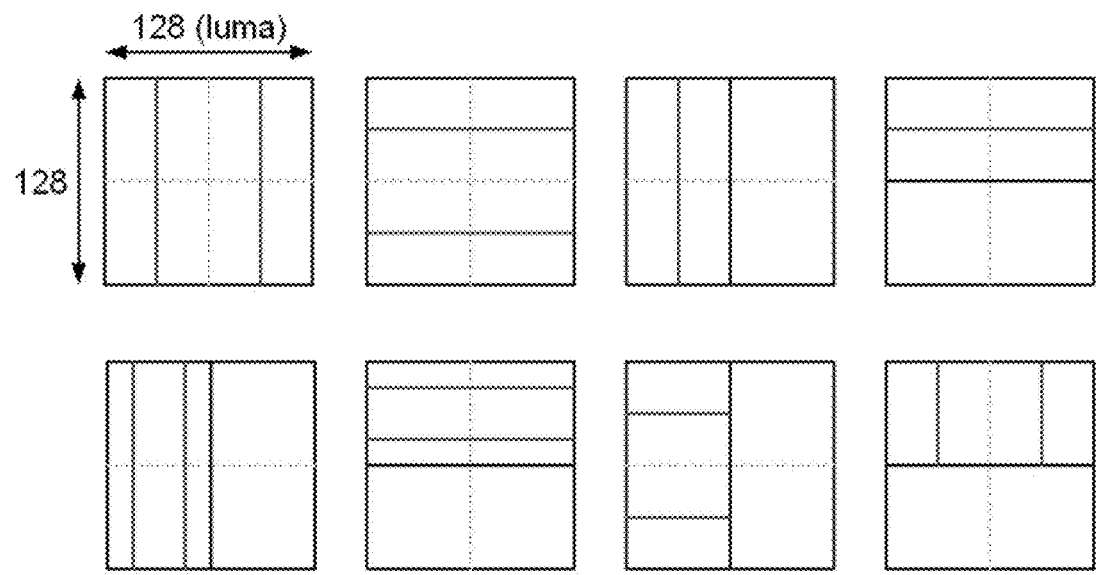
FIG. 11 illustrates various examples of approaches to partitioning or splitting a CTU that, as described herein, can be problematic for processing using a VPDU.
Figure 12:
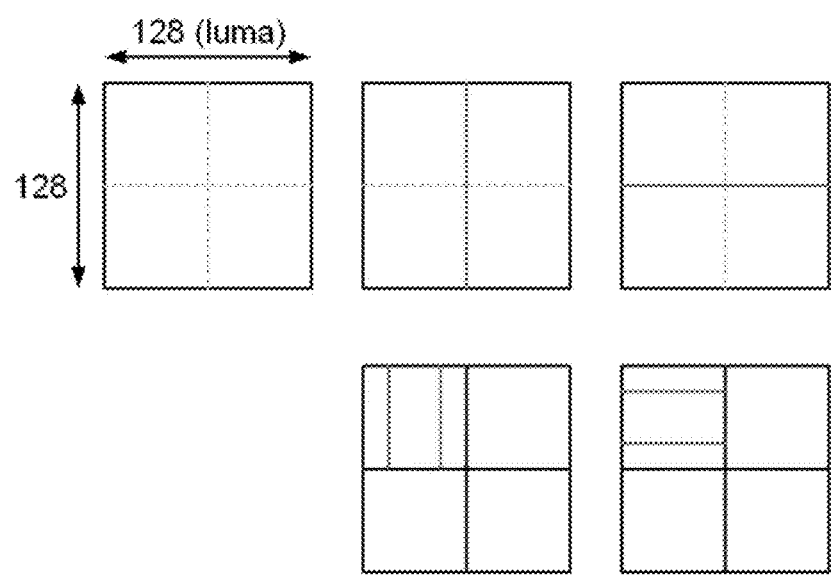
FIG. 12 illustrates various examples of approaches to partitioning or splitting a CTU that, as described herein, can be suitable for processing using a VPDU.

FIG. 11 shows some examples of prohibited BT (binary tree) and TT (triple tree) splits for 128×128 CTU with 64×64 VPDU, while FIG. 12 shows examples of allowed splits.

In general, an aspect of at least one embodiment in accordance with the present disclosure provides an improved handling of the VPDUs by taking into account not only the size and position of the CUs but also their coding mode. For example, taking into account the coding mode can involve constraints on partitioning and/or modification of such constraints. Coding mode as used herein is intended to encompass any of many various ways to code a CU comprising, e.g., inter, intra, skip/merge/AMVP, affine or not, LIC on or off, etc. The preceding list of coding modes is merely intended to provide examples and is not limiting. At least one embodiment involves:
 reducing a set of prohibited partitioning or splits by considering the coding mode of the CU which enables increasing the compression performance of the codec while limiting constraints on the VPDU pipeline; and
 modifying constraints on some splits because of the coding mode of the underlying CUs.

Figure 13:
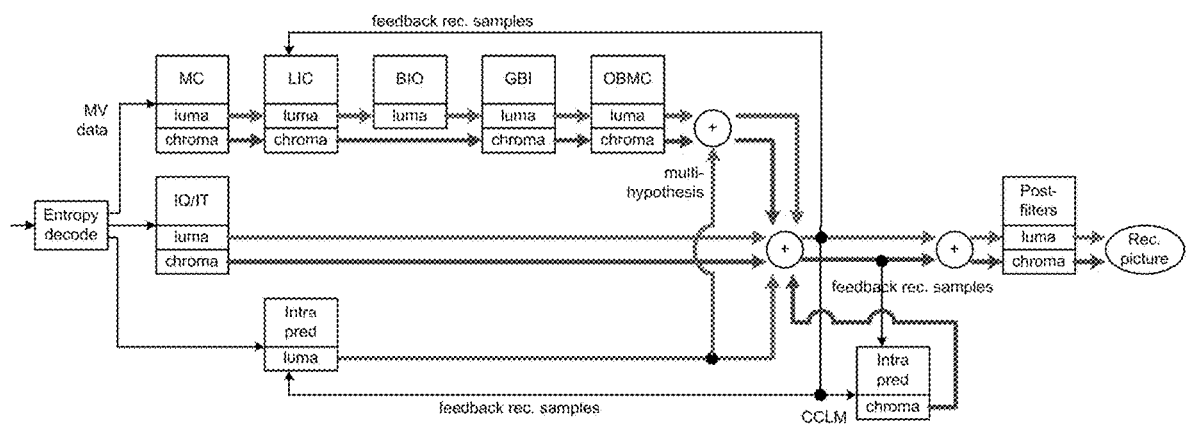
FIG. 13 illustrates an example of a pipeline for CU reconstruction for both inter prediction (top of FIG. 13) and intra prediction (bottom of FIG. 13)

FIG. 13 shows an example of a pipeline arrangement for CU reconstruction such as for WVC. Different tools are optionally applied to reconstruct the CU, depending on the coding mode of the CU. For example, as illustrated in FIG. 13, tools may include at least the following.
 MC: motion compensation.
 LIC: Local illumination compensation. Change the predicted sample values using a linear adaptation.
 BIO: bi-directional optical flow. Change the predicted samples values using the result of an optical flow estimation between the 2 reference blocks used to reconstruct the block. Another variant is DMVR (decoder-side motion vector refinement).
 GBI: Generalized bi-prediction: weighted average of the 2 reference blocks used to reconstruct the block.
 OBMC: overlapped block motion compensation. Weighted (samples position dependent) average of motion compensated blocks using different motion vectors from neighboring blocks.
 IQ/IT: inverse quantization and inverse transform: used to reconstruct a residual.
 Intra pred: used to predict a block using surrounding reconstructed sample values.
 Multi-hypothesis: merge together several predictions (typically inter and intra) using a weighted average dependent on the sample position. Also extend to triangular multi-hypothesis where several inter prediction can be merged inside a block.
 CCLM: Cross Components Linear Model. Use another already reconstructed block from another component to build the current component PU using a linear model.

Figure 14:
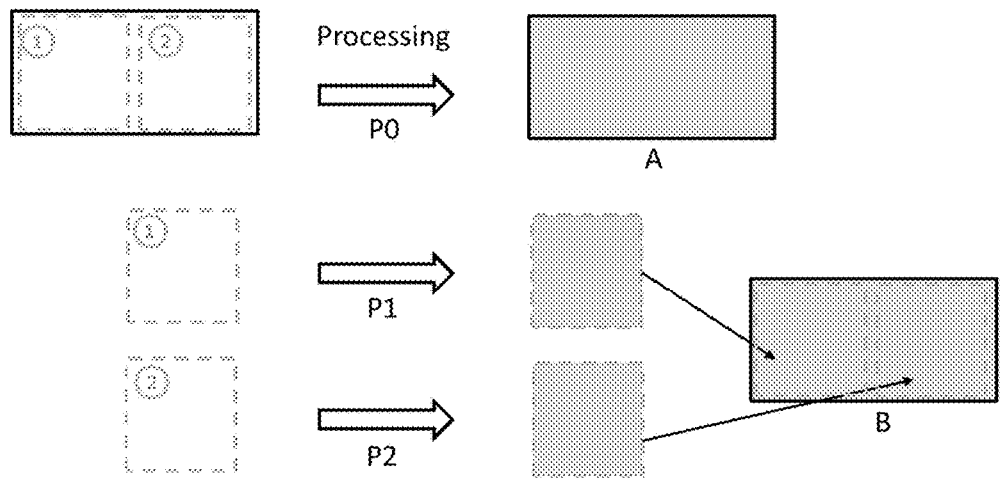
FIG. 14 illustrates an example of a CU split into VPDU and independent processing in accordance with an aspect of at least one embodiment of the present disclosure.
Figure 15:
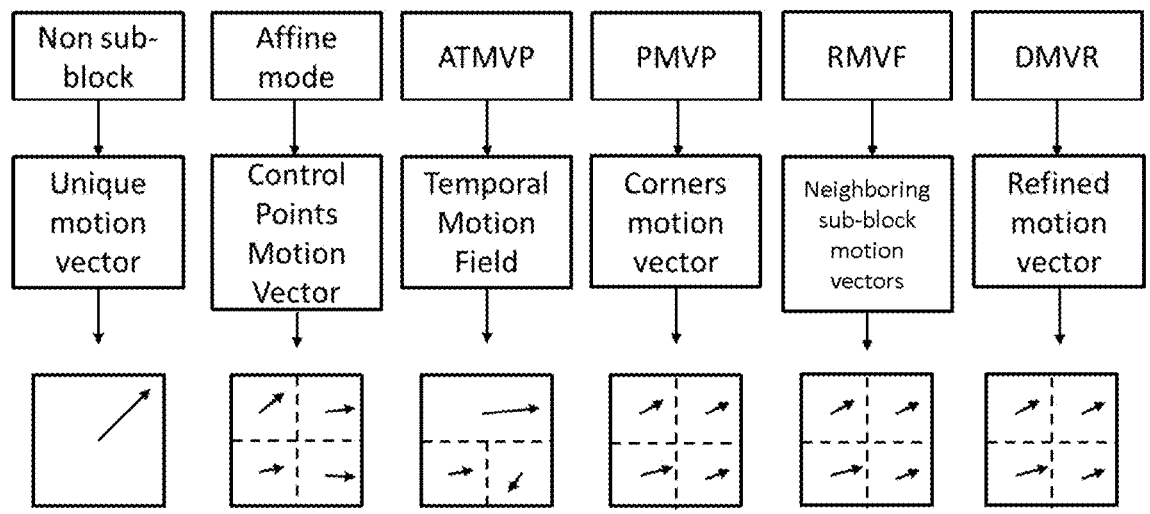
FIG. 15 illustrates various examples of different types of motion field construction as described herein.

The coding tools can be organized into several sets based on consideration of data or information dependency. Information or data dependency as used herein refers to some data from another VPDU that is needed to reconstruct the current VPDU, e.g., reconstructed samples or data needed to compute the prediction which requires some heavy or intensive processing. For example, the following sets of coding modes can be defined:
 Set A: coding modes with strong dependency (typically at pixel level). Referring to the example illustrated in FIG. 14, a strong dependency means that processing P1 or P2 independently is not possible. As an example of such processing:
  Block with residuals: in this case, the residual reconstruction cannot span over several VPDU. Some constraints are already in place in current codec: for example, the maximum transform size in HEVC is 32×32, so that a block with a dimension larger than 32 cannot have a standalone residual. Typically, the resulting coding mode of CU without a residual is a CU in skip mode.
 Set B: coding modes with strong dependency (typically at pixel level), which can be relaxed by splitting the computation. The final result would be different than the one considering the whole CU. In the example of FIG. 14, strong dependency which can be relaxed by splitting the computation means that the results A and B might be different because for instance the reconstruction of some samples in 2 uses some reconstructed samples in 1. Examples included in Set B include:
  Illumination Compensation (LIC): it requires to read the sample around the CU and compute some illumination compensation parameters depending on these samples. As the split CU does not have access to the samples of the other part, the resulting parameters might be different.
  BIO mode: the computation of the optical flow-based correction on the block.
  Block with intra prediction (for example using the multi-hypothesis mode in inter slice): the reference sample buffer used to create the intra prediction depends on the surrounding of the whole CU. Each part cannot have access to the surrounding samples of the other part.
  DMVR (Decoder-side Motion Vector refinement): the motion vector (optionally at sub-block level) are refined at decoder by using the two motion vectors predictor of a bi-prediction as an initial value.
 Set C: coding modes with sub-block dependency. The final result would be the same as the one considering the whole CU, but some additional computations are needed. In the example of FIG. 14, sub-block dependency means that the results A and B are the same. The example in FIG. 15 illustrates examples of different types of motion field construction and provides a list of sub-block or non-sub block motion field creation including:
  Sub-block affine motion field: the computation of the motion vector for each sub-block is done from CPMV (Control Point Motion Vector) motion vectors in the corners of the block. Some computations need to be done twice in case the block is split into several VPDU. Typically, the motion vectors are filled by linear interpolation between CPMV which requires the computation of a difference between CPMV.
  Planar Motion Vector Prediction (PMVP): the motion field is derived from a function of several motion vectors, using a linear interpolation.
  Regression-based Motion Vector Field (RMVF): the motion field is derived from a function of several motion vectors using a linear regression.
  OBMC at sub-block level: for OBMC process inside a CU, the split of a CU into several VPDUs might introduce dependency between the processes.
 Set D: coding modes without dependency. That is, reconstruction is possible without the data of the neighboring VPDU. A simple copy of the parameters is possible. In the example of FIG. 14, "without dependency" means that the results A and B are the same.

Non-sub block motion field: each part of the PU is motion compensated independently.

ATMVP mode: only the initial motion vector needs to be copied. The sub-block motion field can be generated independently for each part of the PU.

GBI: the weighted average of the two predictions can be done independently.

Multi-hypothesis: the weighted average depending on the spatial position of the pixel/sub-block of the two predictions can be done independently.

OBMC at block level: when treating a part of the CU, in case the process does not access data of the other part of the CU.

In general, at least one embodiment in accordance with the present disclosure can include an aspect comprising VPDU constraints modification, adaptation or relaxation. For example, the first constraint described above, i.e., [C1], which corresponds to "for each VPDU containing one or multiple CUs, the CUs are completely contained in the VPDU" can be modified or relaxed. As an example, in at least one example of an embodiment, [C1] can be replaced by a relaxed constraint [C4] wherein "if a CU is not completely contained in one VPDU, the CU reconstruction can be done independently on each VPDU part." The [C4] constraint can be viewed as being similar to the case where a CU is split into multiple VPDUs and these VPDUs are processed independently (e.g., when a 128×128 CTU is split into four VPDUs).

Figure 16:
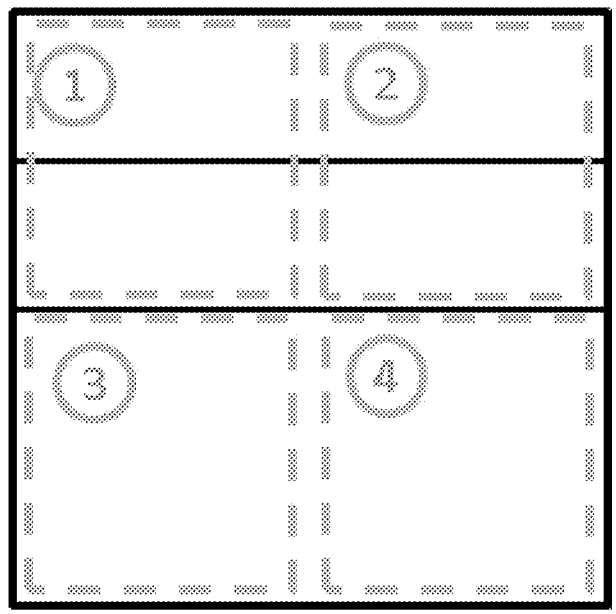
FIG. 16 illustrates an example of partitioning or splitting a CU in accordance with the present disclosure.

FIG. 16 shows an example of relaxed admissible splits. An example of a process at the decoder to handle a partitioning such as the example of FIG. 16 can comprise:

The topology of at least the CUs contained in the VPDU 1 is recovered.

The decoding of parameters of the CUs in VPDU 1 is performed.

The decoding of the parameters of CU in VPDU 2 is performed. In this case, it is simply a copy of parameters of CU in VPDU 1.

The reconstruction of CUs in both VPDU 1 and 2 can take place in parallel.

In general, an aspect of at least one example of an embodiment in accordance with the present disclosure comprises, to break the dependency (and then shorten the pipeline delay) for the reconstruction, introducing a set of constraints on the coding modes for CUs which are adapted or relaxed to span over several VPDUs without completely covering the VPDU. As an example, a set of adapted constraints can comprise:

[C4] if a CU is not completely contained in one VPDU, its reconstruction can be done independently on each sub-part.

[C2] For each CU containing one or more VPDUs, the VPDUs are completely contained in the CU.

[C3] The processing order of CUs shall not leave a VPDU and re-visit it later.

For CUs violating the constraint [C1] but not the constraint [C4], the following constraints can be applied on the coding modes:

Variant 1: The coding mode of the CU cannot use any tool from sets A, B and C, i.e. forbid tools from sets A, B and C; allow only tools from set D.

Variant 2: Alternatively, a relaxed version is to forbid tools from set A and B only, i.e., allow only tools from sets C and D.

Variant 3: Alternatively, an even more relaxed version is to forbid only tools from set A, i.e., allow use of tools from sets B, C and D.

An alternative view of the various embodiments described above involving a plurality of sets of coding tools or coding modes, e.g., sets A, B, C, and D, is that the tools in each set share a data or information dependency or dependency characteristic. For example, the tools or coding modes in set A share, or have in common, a strong data or information dependency characteristic. A partitioning constraint may be associated with a first subset of a plurality of sets and a modified constraint may be associated with a second subset of the plurality of sets where the second subset differs from the first subset. For example, a constraint may be based on set A only, i.e., forbid use of tools in set A. The constraint may be modified, e.g., to forbid coding modes or tools in sets A, B, and C as in variant 1 above.

The above constraints enable saving some syntax elements by inferring some syntax element values. As an example, the CU parsing process can be modified as shown in Table 1 appended to this document when only the set D is used as in variant 1 described above. In Table 1 (and Table 2 described below), modifications to syntax (e.g., modifications to an example of syntax for a codec such as an early version of VVC) are highlighted by using bold italics text.

Figure 17:
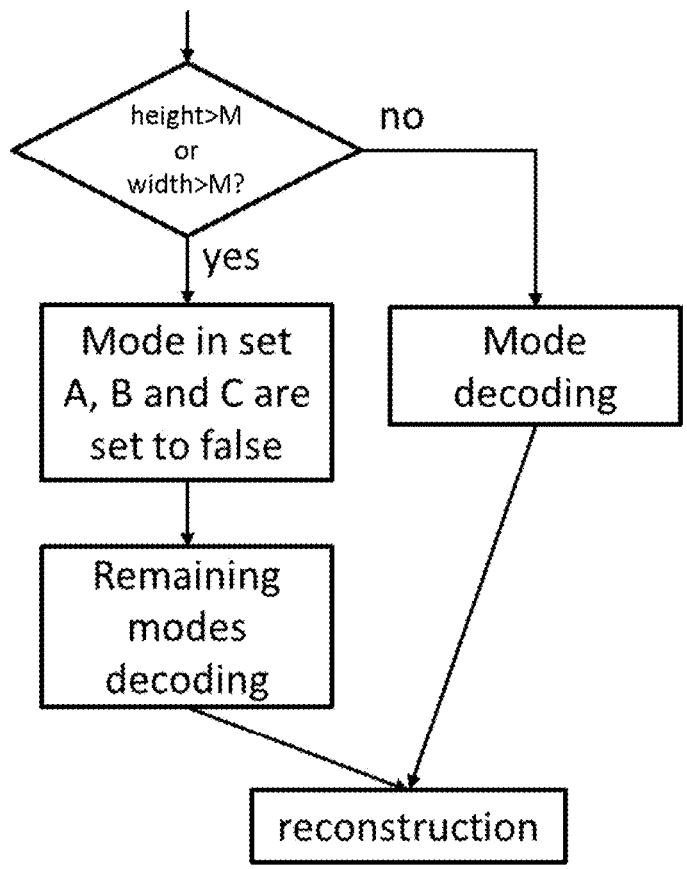
FIG. 17 illustrates an example of at least one embodiment in accordance with the present disclosure.

Another variant of using the set of constrained modes described above is to further constrain the rules [C1], [C2] and [C3]. FIG. 17 illustrates an example where the coding mode of a CU might be more constrained depending on the sets introduced above. In the example of an embodiment of FIG. 17, tools in sets A, B and C are forbidden. That is, only tools in set D are allowed.

Figure 18:
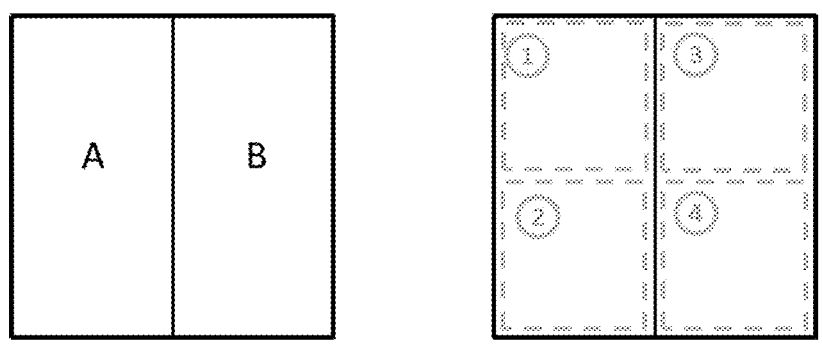
FIG. 18 illustrates an aspect of at least one embodiment in accordance with the present disclosure.

Another example of an embodiment is illustrated in FIG. 18. In the example of FIG. 18, the reconstruction of VPDU-2 in CU A can depend on the reconstruction of VPDU-1, and the reconstruction of VPDU-4 in CU B can depend on the reconstruction of VPDU-3. In general, as aspect of at least one example of an embodiment can comprise forbidding some coding modes for such cases. For example:

Variant 1: The coding mode of the CU cannot use tools inside the sets A, B and C (see FIG. 17)

Variant 2: Alternatively, a relaxed version is to forbid tools from the sets A and B only.

Note that an example of a codec such as WVC may only forbid tools in the set A typically due to the presence of a residual.

The associated syntax for the described further-constrained variants can be like that for the above-described relaxed VPDU case, where some syntax elements are removed because they are inferred. An example when only the set D is allowed (variant 1) is given in Table 2 appended to this document, where M is the VPDU size (typically, M=64).

Figure 20:
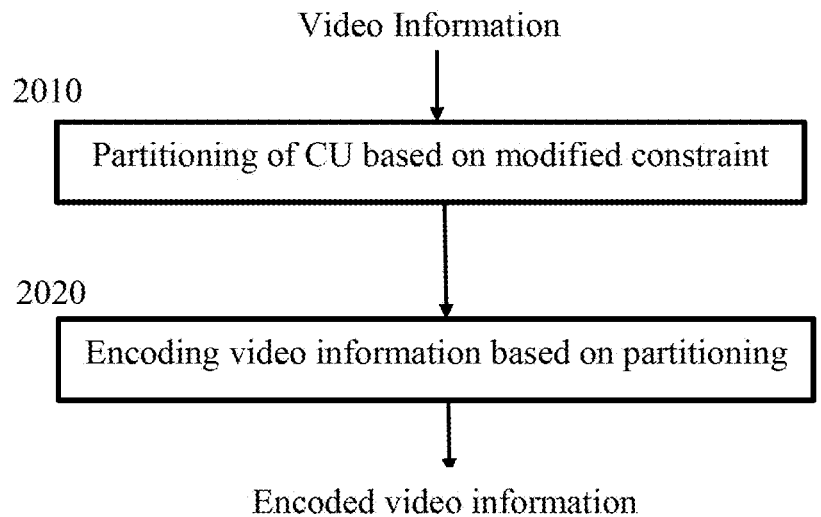
FIG. 20 illustrates an example of an embodiment in accordance with the present disclosure.

In general, one example of an embodiment in accordance with one or more features described above is illustrated in FIG. 20. In FIG. 20, at 2010 a coding unit (CU) parsed from input video information can be partitioned based on a modified constraint, e.g., based on [C4] rather than [C1] as described above. The modification can be based on an information or data dependency such as those associated with coding tool sets A, B, C, D as described above. Video information can then be encoded at 2020 based on the partitioning.

Figure 21:
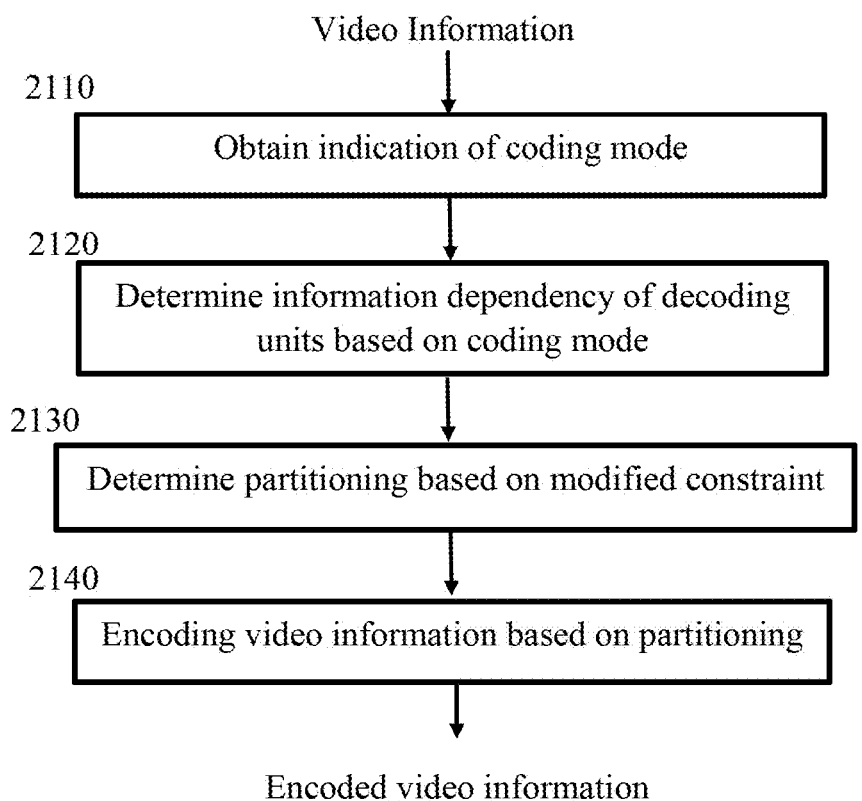
FIG. 21 illustrates an example of another embodiment in accordance with the present disclosure.

In general, another example of an embodiment is illustrated in FIG. 21. In FIG. 21, at 2110, an indication of a coding mode is obtained. Information dependency among decoding units, e.g., such as between VPDU, is determined at 2120 based on the coding mode such as with regard to coding tool sets A, B, C, D described above. Partitioning based on a modified constraint occurs at 2130 where, for example, the modified constraint can be one such as [C4] rather than [C1] or one of the other variants described herein. Encoding video information based on the partitioning occurs at 2140.

The above-described variants for relaxing constraints and for further constraints may be viewed as exclusive in that a particular system having a specific or fixed hardware codec embodiment may implement one of the variants, and the associated constraints, to the exclusion of the others. Alternatively, certain systems may be inclusive of more than one of such variants. For example, a system may be reconfigurable, e.g., include a capability for reconfiguration of hardware and/or software, based on factors such as, but not limited to, content to be processed, power consumption control, performance (speed, latency), etc. In such systems, the reconfiguration capability may include selectively enabling one of a plurality of variants such as those described.

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the number of intra prediction modes (35, or 67), or the number of transform subsets (3). It should be noted that the specific values are for exemplary purposes and the present embodiments are not limited to these specific values.

In the above, various embodiments are described with respect to HEVC, JEM, VTM or WVC. For example, various examples of aspects and embodiments in accordance with the present disclosure may be used to modify the image partitioning module (125) and/or the block partitioning module (230) of the JEM or HEVC encoder and decoder examples shown in FIG. 1 and FIG. 2. However, the present embodiments are not limited to any particular model or standard, and can be applied to other standards, recommendations, and extensions thereof.

Figure 19:
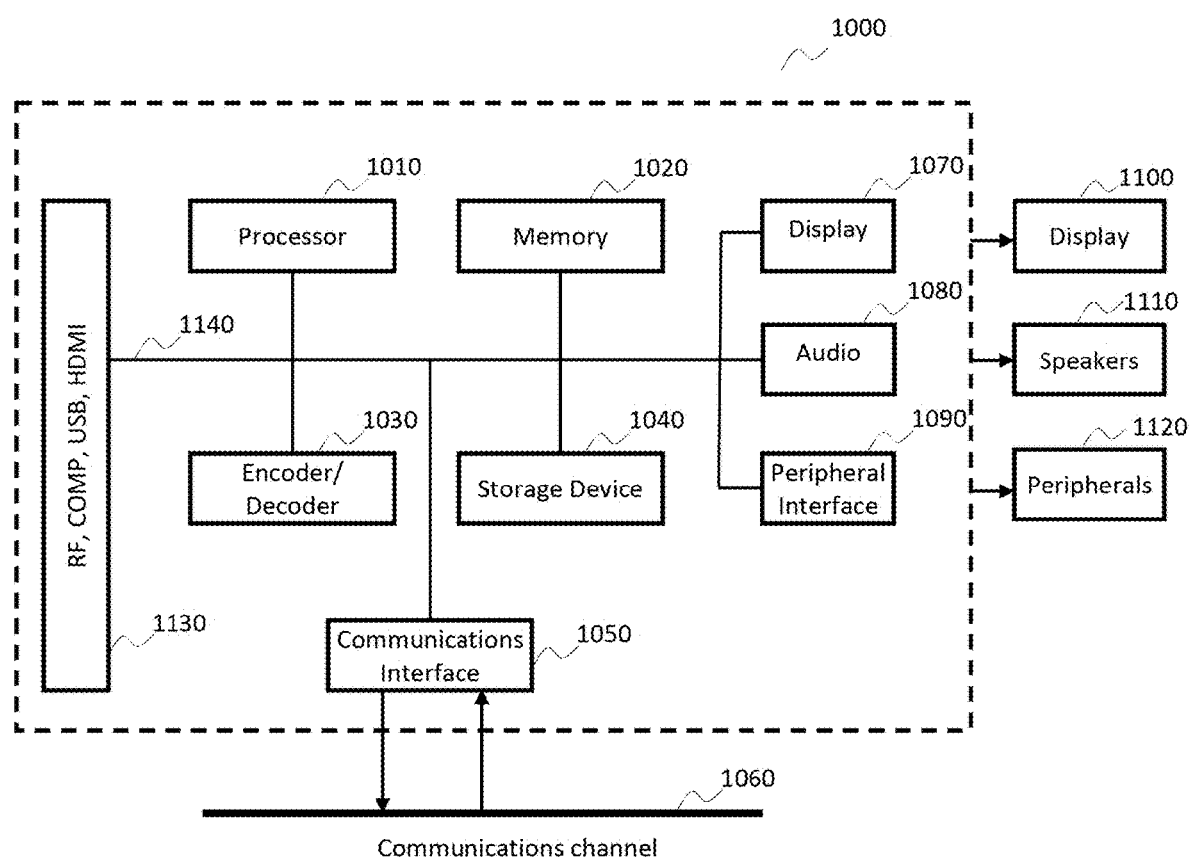
FIG. 19 illustrates a block diagram of an example of a system suitable for implementing one or more of various aspects, embodiments and features in accordance with the present disclosure.

FIG. 19 illustrates a block diagram of an example of a system in which various aspects and embodiments can be implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or WVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Throughout this disclosure, various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting a picture from a tiled (packed) picture, determining an upsample filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Also, various implementations involve encoding. In an analogous way to the above discussion about "decoding", "encoding" as used in this application can encompass all or part of the processes performed, for example, on an input video sequence in order to produce an encoded bitstream or signal. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches can be based on an extensive testing of all encoding options, including all considered modes or coding parameters values, with a complete evaluation of their coding cost and related distortion of the reconstructed signal after coding and decoding. Faster approaches can also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various generalized as well as particularized embodiments are also supported and contemplated throughout this disclosure. Examples of embodiments in accordance with the present disclosure include but are not limited to the following.

In general, at least one example of an embodiment can involve apparatus for video encoding, comprising: one or more processors, wherein the one or more processors are configured to partition a coding unit of the video information using a partitioning based on a modification of a constraint on partitioning, wherein the constraint is associated with a pipeline configuration for reconstruction of the coding unit, and the modification is based on an information dependency between two or more pipeline units associated with the pipeline configuration; and encode the video information based on the partitioning.

In general, at least one example of an embodiment can involve apparatus for decoding video information, comprising one or more processors configured to obtain an indication of a partitioning of a coding unit of the video information, wherein the partitioning is based on a modification of a constraint on partitioning, the constraint is associated with a pipeline configuration for decoding, and the modification is based on an information dependency between two or more pipeline units associated with the pipeline configuration; and decode the video information based on the partitioning and using the pipeline configuration.

In general, at least one example of an embodiment can involve a method for encoding video information, comprising partitioning a coding unit of the video information using a partitioning based on a modification of a constraint on partitioning, wherein the constraint is associated with a pipeline configuration for reconstruction of the coding unit, and the modification is based on an information dependency between two or more pipeline units associated with the pipeline configuration; and encoding the video information based on the partitioning.

In general, at least one example of an embodiment can involve a method for decoding video information, comprising obtaining an indication of a partitioning of a coding unit of the video information, wherein the partitioning is based on a modification of a constraint on partitioning, the constraint is associated with a pipeline configuration for decoding, and the modification is based on an information dependency between two or more pipeline units associated with the pipeline configuration; and decoding the video information based on the partitioning and using the pipeline configuration.

In general, at least one example of an embodiment can involve apparatus for video encoding, comprising one or more processors configured to obtain an indication of a coding mode, determine an information dependency between two or more decoding units based on the coding mode, determine a partitioning for a coding unit based on a modification of a constraint on partitioning, wherein the constraint is based on the information dependency, and encode video information based on the partitioning.

In general, at least one example of an embodiment can involve apparatus for video decoding, comprising one or more processors configured to obtain an indication of a coding mode, obtain an indication of a partitioning of a coding unit, wherein the partitioning is based on a modification of a constraint on partitioning and the constraint is based on the coding mode and an information dependency among two or more decoding units; and decode video information based on the partitioning.

In general, at least one example of an embodiment can involve a method for video encoding, comprising obtaining an indication of a coding mode, determining an information dependency, determining a partitioning for a coding unit based on a modification of a constraint on partitioning, wherein the constraint is based on an information dependency between two or more decoding units based on the coding mode, and encoding video information based on the partitioning.

In general, at least one example of an embodiment can involve a method for video decoding, comprising obtaining an indication of a coding mode, obtaining an indication of a partitioning of a coding unit, wherein the partitioning is based on a modification of a constraint on partitioning, and the constraint is based on the coding mode and an information dependency among two or more decoding units; and decoding video information based on the partitioning.

In general, at least one example of an embodiment can involve apparatus or a method as described herein, wherein the two or more decoding units comprise two or more pipeline units associated with a pipeline configuration for decoding.

In general, at least one example of an embodiment can involve apparatus or a method as described herein, wherein the constraint prevents selection of the partitioning during a coding mode.

In general, at least one example of an embodiment can involve apparatus or a method as described herein, wherein the modification of the constraint comprises relaxing the constraint to enable selection of the partitioning during the coding mode.

In general, at least one example of an embodiment can involve apparatus or a method as described herein, wherein the coding mode involves use of one or more of a plurality of coding tools, each of the plurality of coding tools being associated with one of a plurality of sets of coding tools, wherein the one or more coding tools in a set have a common information dependency characteristic based on the information dependency between the two or more pipeline units, the constraint comprises limiting use of the one or more of the plurality of coding tools during the coding mode to only coding tools included a first subset of the plurality of sets of coding tools, and the modification of the constraint comprises limiting use of coding tools to only those included in a second subset of the plurality of sets of coding tools during the coding mode, wherein the second subset differs from the first subset.

In general, at least one example of an embodiment can involve apparatus or a method as described herein, wherein the two or more pipeline units are virtual pipeline decoding units and the information dependency comprises the coding unit spanning over two or more of the virtual pipeline decoding units.

In general, at least one example of an embodiment can involve apparatus or a method as described herein, wherein the constraint comprises:
- [C1] for a virtual pipeline decoding unit containing one or multiple coding units, the coding units are completely contained in the virtual pipeline decoding unit;
- [C2] for a coding unit containing one or more virtual pipeline decoding units, the virtual pipeline decoding units are completely contained in the coding unit; and
- [C3] the processing order of coding units shall not leave a virtual pipeline decoding unit and re-visit it later; and
wherein
the modification of the constraint comprises modifying [C1] to:
if a coding unit (CU) is not completely contained in one VPDU, then its reconstruction can be done independently on each subpart.

In general, at least one example of an embodiment can involve a bitstream, wherein the bitstream is formed by partitioning a coding unit of video information using a partitioning based on a modification of a constraint on partitioning, wherein the constraint is associated with a pipeline configuration for reconstruction of the coding unit, and the modification is based on an information dependency between two or more pipeline units associated with the pipeline configuration; and encoding the coding unit into the bitstream based on the partitioning.

In general, at least one example of an embodiment can involve a bitstream as described herein and further comprising signaling syntax elements, inserted by an encoder, to enable a decoder to obtain from the signaling syntax an indication of the partitioning of the coding unit and the modification of the constraint associated with the pipeline configuration, and to decode the video information based on the partitioning and using the pipeline configuration.

In general, at least one example of an embodiment can involve a non-transitory computer readable medium containing data content generated by an apparatus or method, or associated with a bitstream, as described herein.

In general, at least one example of an embodiment can involve a computer program product comprising instructions for performing any embodiment of a method as described herein when executed by one of more processors.

In general, at least one example of an embodiment can involve a device comprising an apparatus in accordance with any embodiment described herein and further comprising at least one of (i) an antenna configured to receive a signal, the signal including data representative of the video information, (ii) a band limiter configured to limit the received signal to a band of frequencies that includes the data representative of the video data, and (iii) a display configured to display an image from the video data.

In general, at least one example of an embodiment can involve a device as described herein, wherein the device can comprise one of a television signal receiver, a set-top box, a gateway device, a mobile device, or other electronic device.

Various embodiments have been described. Embodiments may include any of the following features or entities, alone or in any combination, across various different claim categories and types:
- Providing for video encoding comprising obtaining an indication of a coding mode, determining an information dependency between two or more decoding units based on the coding mode, determining a partition for a coding unit based on the information dependency, and encoding video information based on the partition.
- Providing for video decoding comprising obtaining an indication of a coding mode, determining an information dependency between two or more decoding units based on the coding mode, determining a partition for a coding unit based on the information dependency, and decoding video information based on the partition.
- Providing for video encoding comprising obtaining a data dependency between two or more virtual pipeline decoding units based on a coding mode, determining a splitting topology for a coding unit based on the data dependency, and encoding video information based on the splitting topology.
- Providing for video decoding comprising obtaining a data dependency between two or more virtual pipeline decoding units based on a coding mode, determining a splitting topology for a coding unit based on the data dependency, and decoding video information based on the splitting topology.
- Providing for video encoding comprising obtaining a coding mode of a coding unit based on a set of constraints on the coding modes for a coding unit which spans over a plurality of virtual pipeline decoding units, wherein the constraints comprise
  if a coding unit (CU) is not completely contained in one VPDU, then its reconstruction can be done independently on each subpart;
  for each CU containing one or more VPDUs, the VPDUs are completely contained in the CU; and
  the processing order of CUs shall not leave a VPDU and re-visit it later.
- Providing for video decoding based on a coding mode of a coding unit established based on a set of constraints on the coding modes for a coding unit which spans over a plurality of virtual pipeline decoding units, wherein the constraints comprise
  if a coding unit (CU) is not completely contained in one VPDU, then its reconstruction can be done independently on each subpart;
  for each CU containing one or more VPDUs, the VPDUs are completely contained in the CU; and
  the processing order of CUs shall not leave a VPDU and re-visit it later.

Providing for one or more syntax elements indicating a coding mode, wherein the one or more syntax elements enable
- determining an information dependency between two or more decoding units based on the coding mode,
- determining a partition for a coding unit based on the information dependency, and
- encoding and/or decoding video information based on the partition.

Providing for a bitstream formed by including information indicating a coding mode, wherein the information enables
- determining an information dependency between two or more decoding units based on the coding mode,
- determining a partition for a coding unit based on the information dependency, and
- encoding and/or decoding video information based on the partition.

Providing, in an encoder and/or a decoder, for establishing a set of constraints on a coding mode for a coding unit spanning two or more virtual pipeline decoding units (VPDU) without covering the VPDU, wherein the set of constraints comprises:
- if a coding unit (CU) is not completely contained in one VPDU, then its reconstruction can be done independently on each subpart;
- for each CU containing one or more VPDUs, the VPDUs are completely contained in the CU; and
- the processing order of CUs shall not leave a VPDU and re-visit it later.

Providing, in an encoder and/or a decoder, for grouping coding modes into a plurality of sets based on a dependency among virtual pipeline decoding units, wherein each set has a different dependency, and for establishing constraints on selection of a coding mode based on to which of the plurality of sets a coding mode belongs.

Inserting in the signaling syntax, by an encoder, elements that enable a decoder to obtain from the signaling syntax an indication of a coding mode, determining an information dependency between two or more decoding units based on the coding mode, determining a partition for a coding unit based on the information dependency, and decoding video information based on the partition.

A bitstream or signal that includes one or more of the described syntax elements, or variations thereof.

Creating and/or transmitting and/or receiving and/or decoding a bitstream or signal that includes one or more of the described syntax elements, or variations thereof.

A TV, set-top box, cell phone, tablet, or other electronic device that performs video encoding and/or decoding according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs video encoding and/or decoding according to any of the embodiments described.

A TV, set-top box, cell phone, tablet, or other electronic device that receives (e.g. using an antenna) a signal over the air that includes an encoded image, and performs video encoding and/or decoding according to any of the embodiments described.

A computer program product storing program code that, when executed by a computer implements video encoding and/or decoding in accordance with any of the embodiments described.

A non-transitory computer readable medium including executable program instructions causing a computer executing the instructions to implement video encoding and/or decoding in accordance with any of the embodiments described.

A computer readable storage medium having stored thereon a bitstream generated in accordance with one or more aspects and/or embodiments described herein.

A method and apparatus for transmitting the bitstream generated in accordance with one or more aspects and/or embodiments described herein.

Various other generalized as well as particularized embodiments are also supported and contemplated throughout this disclosure.

TABLE 1

| | Descriptor |
|---|---|
| coding_unit( x0, y0, cbWidth, cbHeight, treeType ) { | |
|   if( slice_type != I ) { | |
|     if ( !constraint1&&constraint4) | |
|       cu_skip_flag[x0 ][y0 ]=1 | |
|     Else | |
|       cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( treeType = = SINGLE_TREE \|\| treeType = = DUAL_TREE_LUMA ) { | |
|       intra_luma_mpm_flag[ x0 ][ y0 ] | ae(v) |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE \|\| treeType = = DUAL_TREE_CHROMA ) | |
|       intra_chroma_pred_mode[ x0 ][ y0 ] | ae(v) |
|   } else { /* MODE_INTER */ | |
|     if( cu_skip_flag[ x0 ][ y0 ] ) { | |
|       if( sps_affine_enabled_flag && cbWidth >=8 && cbHeight >= 8 && | |
|         ( MotionModelIdc[ x0 − 1 ][ y0 + cbHeight − 1 ] != 0 \|\| | |
|         MotionModelIdc[ x0 − 1 ][ y0 + cbHeight ] != 0 \|\| | |
|         MotionModelIdc[ x0 − 1 ][ y0 − 1 ] != 0 \|\| | |

TABLE 1-continued

| | Descriptor |
|---|---|
|       MotionModelIdc[ x0 + cbWidth − 1 if y0 − 1 ] != 0 ‖<br>      MotionModelIdc[ x0 + cbWidth ][ y0 − 1 ]] != 0 )<br>      &&!( !constraint1&&constraint4)<br>      )<br>      merge_affine_flag[ x0 ][ y0 ] | ae(v) |
|       if( merge_affine_flag[ x0 ][ y0 ] = = 0 && MaxNumMergeCand > 1 )<br>        merge_idx[ x0 ][ y0 ] | ae(v) |
|     } else {<br>      merge_flag[ x0 ][ y0 ] | ae(v) |
|       if( merge_flag[ x0 ][ y0 ] ) {<br>        if( sps_affine_enabled_flag && cbWidth >= 8 && cbHeight >= 8 &&<br>          ( MotionModelIdc[ x0 − 1 ][ y0 + cbHeight − 1 ] != 0 ‖<br>          MotionModelIdc[ x0 − 1 ][ y0 + cbHeight ] != 0 ‖<br>          MotionModelIdc[ x0 − 1 ][ y0 − 1 ] != 0 ‖<br>          MotionModelIdc[ x0 + cbWidth − 1 if y0 − 1 ] != 0 ‖<br>          MotionModelIdc[ x0 + cbWidth ][ y0 − 1 ]] != 0 )<br>        merge_affine_flag[ x0 ][ y0 ] | ae(v) |
|         if( merge_affine_flag[ x0 ][ y0 ] = = 0 && MaxNumMergeCand > 1 )<br>          merge_idx[ x0 ][ y0 ] | ae(v) |
|       } else {<br>        if( slice_type = = B )<br>          inter_pred_idc[ x0 ][ y0 ] | ae(v) |
|         if( sps_affine_enabled_flag && cbWidth >= 16 && cbHeight >= 16 ) {<br>          inter_affine_flag[ x0 ][ y0 ] | ae(v) |
|           if( sps_affine_type_flag && inter_affine_flag[ x0 ][ y0 ] )<br>            cu_affine_type_flag[ x0 ][ y0 ] | ae(v) |
|         }<br>        if( inter_pred_idc[ x0 ][ y0 ] != PRED_L1 ) {<br>          if( num_ref_idx l0_active_minus1 > 0 )<br>            ref_idx_l0[ x0 ][ y0 ] | ae(v) |
|           mvd_coding( x0, y0, 0, 0 )<br>          if( MotionModelIdc[ x0 ][ y0 ] > 0 )<br>            mvd_coding( x0, y0, 0, 1 )<br>          if(MotionModelIdc[ x0 ][ y0 ] 1 > 1 )<br>            mvd_coding( x0, y0, 0, 2 )<br>          mvp_l0_flag[ x0 ][ y0 ] | ae(v) |
|         } else {<br>          MvdL0[ x0 ][ y0 ][ 0 ] = 0<br>          MvdL0[ x0 ][ y0 ][ 1 ] = 0<br>        }<br>        if( inter_pred_idc[ x0 ][ y0 ] != PRED_L0 ) {<br>          if( num_ref idx_l1_active_minus1 > 0)<br>            ref_idx_l1[ x0 ][ y0 ] | ae(v) |
|           if( mvd_l1_zero_flag && inter_pred_idc[ x0 ][ y0 ] = = PRED_BI ) {<br>            MvdL1[ x0 ][ y0 ][ 0 ] = 0<br>            MvdL1[ x0 ][ y0 ][ 1 ] = 0<br>            MvdCpL1[ x0 ][ y0 ][ 0 ][ 0 ] = 0<br>            MvdCpL1[ x0 ][ y0 ][ 0 ][ 1 ] = 0<br>            MvdCpL1[ x0 ][ y0 ][ 1 ][ 0 ] = 0<br>            MvdCpL1[ x0 ][ y0 ][ 1 ][ 1 ] = 0<br>            MvdCpL1[ x0 ][ y0 ][ 2 ][ 0 ] = 0<br>            MvdCpL1[ x0 ][ y0 ][ 2 ][ 1 ] = 0<br>          } else {<br>            mvd_coding( x0, y0, 1, 0 )<br>            if( MotionModelIdc[ x0 ][ y0 ] > 0 )<br>              mvd_coding( x0, y0, 1, 1 )<br>            if(MotionModelIdc[ x0 ][ y0 ] > 1 )<br>              mvd_coding( x0, y0, 1, 2 )<br>          mvp_l1_flag[ x0 ][ y0 ] | ae(v) |
|         } else {<br>          MvdL1[ x0 ][ y0 ][ 0 ] = 0<br>          MvdL1[ x0 ][ y0 ][ 1 ] = 0<br>        }<br>        if( sps_amvr_enabled_flag && inter_affine_flag = = 0 &&<br>          ( MvdL0[ x0 ][ y0 ][ 0 ] != 0 ‖ MvdL0[ x0 ][ y0 ][ 1 ] != 0 ‖<br>          MvdL1[ x0 ][ y0 ][ 0 ] != 0 ‖ MvdL1[ x0 ][ y0 ][ 1 ] != 0 ) )<br>          amvr_mode[ x0 ][ y0 ] | ae(v) |
|       }<br>    }<br>  }<br>  if( CuPredMode[ x0 ][ y0 ] != MODE_INTRA && cu_skip_flag[ x0 ][ y0 ] = = 0 )<br>    cu_cbf | ae(v) |
|   if( cu_cbf ) {<br>    transform_tree( x0, y0, cbWidth, cbHeight, treeType )<br>} | |

TABLE 2

| | Descriptor |
|---|---|
| coding_unit( x0, y0, cbWidth, cbHeight, treeType ) { | |
|   if( slice_type != I ) { | |
|     if ( height>M \|\| width > M) | |
|       cu_skip_flag[x0 ][y0 ]=1 | |
|     else | |
|       cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( treeType = = SINGLE_TREE \|\| treeType = = DUAL_TREE_LUMA ) { | |
|       intra_luma_mpm_flag[ x0 ][ y0 ] | ae(v) |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE \|\| treeType = = DUAL_TREE_CHROMA ) | |
|       intra_chroma_pred_mode[ x0 ][ y0 ] | ae(v) |
|   } else { /* MODE_INTER */ | |
|     if( cu_skip_flag[ x0 ][ y0 ] ) { | |
|       if( sps_affine_enabled_flag && cbWidth >=8 && cbHeight >= 8 && | |
|         ( MotionModelIdc[ x0 − 1 ][ y0 + cbHeight − 1 ] != 0 \|\| | |
|         MotionModelIdc[ x0 − 1 ][ y0 + cbHeight ] != 0 \|\| | |
|         MotionModelIdc[ x0 − 1 ][ y0 − 1 ] != 0 \|\| | |
|         MotionModelIdc[ x0 + cbWidth − 1 if y0 − 1 ] != 0 \|\| | |
|         MotionModelIdc[ x0 + cbWidth ][ y0 − 1 ]] != 0 ) | |
|       && !( height>M \|\| width > M) | |
|       ) | |
|       merge_affine_flag[ x0 ][ y0 ] | ae(v) |
|       if( merge_affine_flag[ x0 ][ y0 ] = = 0 && MaxNumMergeCand > 1 ) | |
|         merge_idx[ x0 ][ y0 ] | ae(v) |
|     } else { | |
|       merge_flag[ x0 ][ y0 ] | ae(v) |
|       if( merge_flag[ x0 ][ y0 ] ) { | |
|         if( sps_affine_enabled_flag && cbWidth >= 8 && cbHeight >= 8 && | |
|           ( MotionModelIdc[ x0 − 1 ][ y0 + cbHeight − 1 ] != 0 \|\| | |
|           MotionModelIdc[ x0 − 1 ][ y0 + cbHeight ] != 0 \|\| | |
|           MotionModelIdc[ x0 − 1 ][ y0 − 1 ] != 0 \|\| | |
|           MotionModelIdc[ x0 + cbWidth − 1 if y0 − 1 ] != 0 \|\| | |
|           MotionModelIdc[ x0 + cbWidth ][ y0 − 1 ]] != 0 ) | |
|         merge_affine_flag[ x0 ][ y0 ] | ae(v) |
|         if( merge_affine_flag[ x0 ][ y0 ] = = 0 && MaxNumMergeCand > 1 ) | |
|           merge_idx[ x0 ][ y0 ] | ae(v) |
|       } else { | |
|         if( slice_type = = B ) | |
|           inter_pred_idc[ x0 ][ y0 ] | ae(v) |
|         if( sps_affine_enabled_flag && cbWidth >= 16 && cbHeight >= 16 ) { | |
|           inter_affine_flag[ x0 ][ y0 ] | ae(v) |
|           if( sps_affine_type_flag && inter_affine_flag[ x0 ][ y0 ] ) | |
|             cu_affine_type_flag[ x0 ][ y0 ] | ae(v) |
|         } | |
|         if( inter_pred_idc[ x0 ][ y0 ] != PRED_L1 ) { | |
|           if( num_ref_idx_l0_active_minus1 > 0 ) | |
|             ref_idx_l0[ x0 ][ y0 ] | ae(v) |
|           mvd_coding( x0, y0, 0, 0 ) | |
|           if( MotionModelIdc[ x0 ][ y0 ] > 0 ) | |
|             mvd_coding( x0, y0, 0, 1 ) | |
|           if(MotionModelIdc[ x0 ][ y0 ] 1 > 1 ) | |
|             mvd_coding( x0, y0, 0, 2 ) | |
|           mvp_l0_flag[ x0 ][ y0 ] | ae(v) |
|         } else { | |
|           MvdL0[ x0 ][ y0 ][ 0 ] = 0 | |
|           MvdL0[ x0 ][ y0 ][ 1 ] = 0 | |
|         } | |
|         if( inter_pred_idc[ x0 ][ y0 ] != PRED_L0 ) { | |
|           if( num_ref_idx_l1_active_minus1 > 0) | |
|             ref_idx_l1[ x0 ][ y0 ] | ae(v) |
|           if( mvd_l1_zero_flag && inter_pred_idc[ x0 ][ y0 ] = = PRED_BI ) { | |
|             MvdL1[ x0 ][ y0 ][ 0 ] = 0 | |
|             MvdL1[ x0 ][ y0 ][ 1 ] = 0 | |
|             MvdCpL1[ x0 ][ y0 ][ 0 ][ 0 ] = 0 | |
|             MvdCpL1[ x0 ][ y0 ][ 0 ][ 1 ] = 0 | |
|             MvdCpL1[ x0 ][ y0 ][ 1 ][ 0 ] = 0 | |
|             MvdCpL1[ x0 ][ y0 ][ 1 ][ 1 ] = 0 | |
|             MvdCpL1[ x0 ][ y0 ][ 2 ][ 0 ] = 0 | |
|             MvdCpL1[ x0 ][ y0 ][ 2 ][ 1 ] = 0 | |
|           } else { | |

TABLE 2-continued

| | Descriptor |
|---|---|
|       mvd_coding( x0, y0, 1, 0 )<br>     if( MotionModelIdc[ x0 ][ y0 ] > 0 )<br>       mvd_coding( x0, y0, 1, 1 )<br>     if(MotionModelIdc[ x0 ][ y0 ] > 1 )<br>       mvd_coding( x0, y0, 1, 2 )<br>     mvp_l1_flag[ x0 ][ y0 ] | ae(v) |
|    } else {<br>     MvdL1[ x0 ][ y0 ][ 0 ] = 0<br>     MvdL1[ x0 ][ y0 ][ 1 ] = 0<br>   }<br>   if( sps_amvr_enabled_flag && inter_affine_flag = = 0 &&<br>    ( MvdL0[ x0 ][ y0 ][ 0 ] != 0 \|\| MvdL0[ x0 ][ y0 ][ 1 ] != 0 \|\|<br>    MvdL1[ x0 ][ y0 ][ 0 ] != 0 \|\| MvdL1[ x0 ][ y0 ][ 1 ] != 0 ) )<br>    amvr_mode[ x0 ][ y0 ] | ae(v) |
|    }<br>  }<br> }<br>if( CuPredMode[ x0 ][ y0 ] != MODE_INTRA && cu_skip_flag[ x0 ][ y0 ] = = 0 )<br>  cu_cbf<br>if( cu_cbf ) {<br>  transform_tree( x0, y0, cbWidth, cbHeight, treeType )<br>} | ae(v) |

The invention claimed is:

1. A method for decoding a coding unit, comprising:
determining that a coding unit spans over at least a first virtual pipeline decoding unit and a second virtual pipeline decoding unit without completely covering the first virtual pipeline decoding unit and the second virtual pipeline decoding unit;
in response to the determining, obtaining a coding mode for the coding unit in a sub-set of a set of coding modes larger than the sub-set, wherein the sub-set comprises at least one coding mode without dependency, wherein the coding mode without dependency is a coding mode involving at least one processing tool giving identical results whether the processing tool is applied to an entire coding unit or independently to each sub-block of the entire coding unit; and
decoding, based on the obtained coding mode, a coding unit sub-block falling entirely within the first virtual pipeline decoding unit independently of a coding sub-block falling entirely within the second virtual pipeline decoding unit.

2. The method of claim 1, wherein the sub-set comprises a coding mode involving a processing tool with some sub-block dependency which gives identical results whether the processing tool is applied to the entire coding unit or independently to each coding unit sub-block.

3. The method of claim 1, further comprising excluding from the sub-set a coding mode involving a processing tool giving different results whether the processing tool is applied to the entire coding unit or independently to each coding unit sub-block.

4. The method of claim 1, further comprising excluding from the sub-set a coding mode involving a processing tool which cannot be applied independently to each coding unit sub-block.

5. An apparatus for decoding a coding unit, comprising one or more processors configured to implement:
determining that a coding unit spans over at least a first virtual pipeline decoding unit and a second virtual pipeline decoding unit without completely covering the first virtual pipeline decoding unit and the second virtual pipeline decoding unit;
in response to the determining, obtaining a coding mode for the coding unit in a sub-set of a set of coding modes larger than the sub-set, wherein the sub-set comprises at least one coding mode without dependency, wherein the coding mode without dependency is a coding mode involving at least one processing tool giving identical results whether the processing tool is applied to an entire coding unit or independently to each sub-block of the entire coding unit; and
decoding, based on the obtained coding mode, a coding unit sub-block falling entirely within the first virtual pipeline decoding unit independently of a coding sub-block falling entirely within the second virtual pipeline decoding unit.

6. The apparatus of claim 5, wherein the sub-set comprises a coding mode involving a processing tool with some sub-block dependency which gives identical results whether the processing tool is applied to the entire coding unit or independently to each coding unit sub-block.

7. The apparatus of claim 5, wherein the one or more processors are configured to implement excluding from the sub-set a coding mode involving a processing tool giving different results whether the processing tool is applied to the entire coding unit or independently to each coding unit sub-block.

8. The apparatus of claim 5, wherein the one or more processors are configured to implement excluding from the sub-set a coding mode involving a processing tool which cannot be applied independently to each coding unit sub-block.

9. A method for encoding a coding unit, comprising:
determining that a coding unit spans over at least a first virtual pipeline decoding unit and a second virtual pipeline decoding unit without completely covering the first virtual pipeline decoding unit and the second virtual pipeline decoding unit;
in response to the determining, obtaining a coding mode for the coding unit in a sub-set of a set of coding modes larger than the sub-set, wherein the sub-set comprises at least one coding mode without dependency, wherein the coding mode without dependency is a coding mode involving at least one processing tool giving identical results whether the processing tool is applied to an entire coding unit or independently to each sub-block of the entire coding unit; and encoding, based on the obtained coding mode, a coding unit sub-block falling entirely within the first virtual pipeline decoding unit independently of a coding sub-block falling entirely within the second virtual pipeline decoding unit.

10. The method of claim 9, wherein the sub-set comprises a coding mode involving a processing tool with some sub-block dependency which gives identical results whether the processing tool is applied to the entire coding unit or independently to each coding unit sub-block.

11. The method of claim 9, further comprising excluding from the sub-set a coding mode involving a processing tool giving different results whether the processing tool is applied to the entire coding unit or independently to each coding unit sub-block.

12. The method of claim 9, further comprising excluding from the sub-set a coding mode involving a processing tool which cannot be applied independently to each coding unit sub-block.

13. An apparatus for encoding a coding unit, comprising one or more processors configured to implement:

determining that a coding unit spans over at least a first virtual pipeline decoding unit and a second virtual pipeline decoding unit without completely covering the first virtual pipeline decoding unit and the second virtual pipeline decoding unit;

in response to the determining, obtaining a coding mode for the coding unit in a sub-set of a set of coding modes larger than the sub-set, wherein the sub-set comprises at least one coding mode without dependency, wherein the coding mode without dependency is a coding mode involving at least one processing tool giving identical results whether the processing tool is applied to an entire coding unit or independently to each sub-block of the entire coding unit; and encoding, based on the obtained coding mode, a coding unit sub-block falling entirely within the first virtual pipeline decoding unit independently of a coding sub-block falling entirely within the second virtual pipeline decoding unit.

14. The apparatus of claim 13, wherein the sub-set comprises a coding mode involving a processing tool with some sub-block dependency which gives identical results whether the processing tool is applied to the entire coding unit or independently to each coding unit sub-block.

15. The apparatus of claim 13, wherein the one or more processors are configured to implement excluding from the sub-set a coding mode involving a processing tool giving different results whether the processing tool is applied to the entire coding unit or independently to each coding unit sub-block.

16. The apparatus of claim 13, wherein the one or more processors are configured to implement excluding from the sub-set a coding mode involving a processing tool which cannot be applied independently to each coding unit sub-block.

* * * * *